Figure 4:
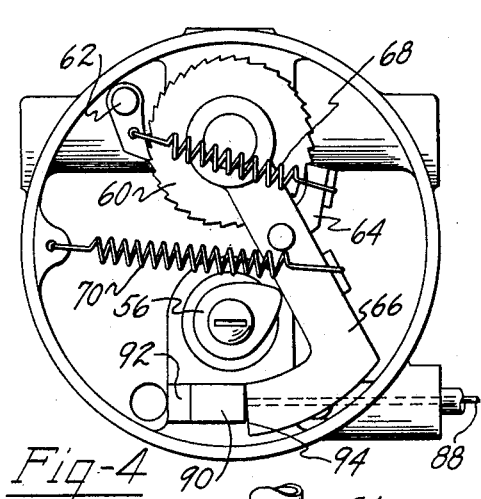

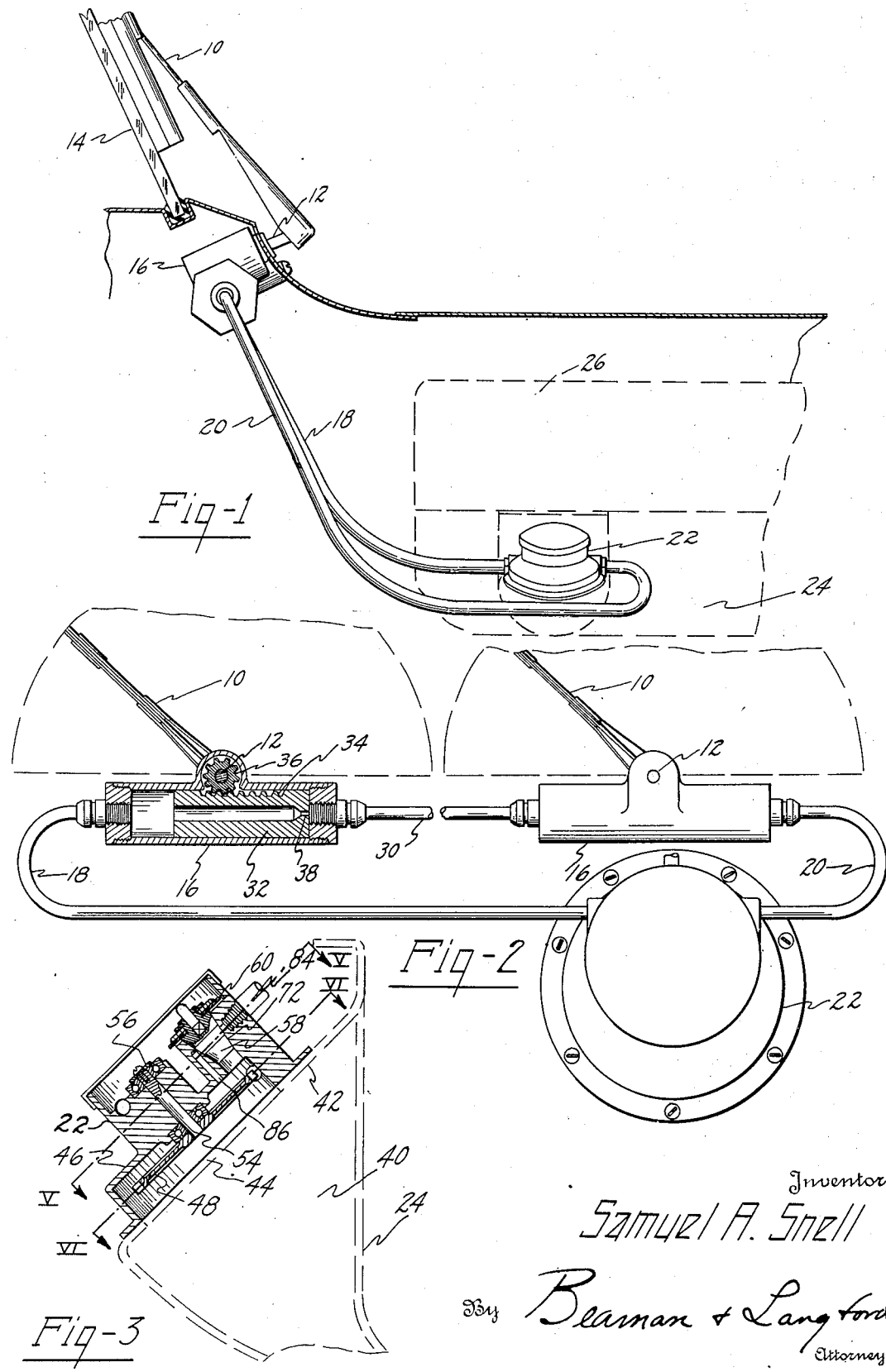

Feb. 27, 1945. S. A. SNELL 2,370,376
WINDSHIELD WIPER MECHANISM
Filed May 1, 1939 3 Sheets-Sheet 2

Inventor
Samuel A. Snell
By Beaman & Langford
Attorneys

Feb. 27, 1945. S. A. SNELL 2,370,376
WINDSHIELD WIPER MECHANISM
Filed May 1, 1939 3 Sheets-Sheet 3

Inventor
Samuel A. Snell
By Beaman & Langford
Attorneys

Patented Feb. 27, 1945

2,370,376

UNITED STATES PATENT OFFICE 2,370,376

WINDSHIELD WIPER MECHANISM

Samuel A. Snell, Jackson, Mich., assignor, by mesne assignments, to Ryerson & Haynes, Inc., Jackson, Mich., a corporation of Michigan Application May 1, 1939, Serial No. 271,111

2 Claims. (Cl. 121—147)

The present invention relates to improvements in distributing mechanism for fluids under pressure for vibrating or otherwise actuating power transmitting structure and has particular reference to devices of this type which are adaptable to the operation of windshield wiper mechanism for vehicles.

While the patented and commercial art in the field of windshield wiper actuating mechanism has been highly developed, operation,and cost of construction of commercial forms has not proven to be all that may be reasonably desired. Due to the irregularity of manifold sub-atmospheric pressure in sufficient amount to give continuous and uniform operation of suction actuated wiper mechanism, numerous arrangements have been proposed in suction boosters. Several of such boosters at least in the patented art have included the use of oil under pressure in the lubricating system of the vehicle as the operating medium. Also, in U. S. Patent No. 1,731,048 to Holmes et al., a motor driven by oil pressure and actuating the wiper through a flexible wire is disclosed. U. S. Patent No. 2,131,341 to Waters shows a somewhat similar arrangement. These prior disclosures have failed to utilize to the fullest extent, however, the uniformity and sufficiency of pressure of the lubricating system available for wiper operation, the compactness and simplicity of construction possible, and the improved character of operation of the wiper which becomes possible including a much desired parking feature. It is considered that the present development is an improvement upon the disclosure of U. S. Patent No. 932,051 to McKee.

Thus the primary object of the present invention is to provide actuating mechanism particularly adapted for windshield wipers of vehicles which is of practical construction adequately and uniformly powered and sufficiently compact in structure as to lend itself to installation on or adjacent the windshield frame with a minimum of space consumption.

Another object of the invention is to provide a practical windshield wiper actuating mechanism for vehicles in which a relatively non-compressible fluid under pressure is directly employed for the operation of the wiper structure.

Another object is to provide an accessory operating mechanism in which a valve actuated from the power plant of a vehicle or other device controls the operation of an accessory solely through the fluid controlled by the valve.

Another object is to provide a fluid actuated mechanism for windshield wipers and other oscillated or reciprocated accessories in which valve mechanism for regulating the direction of movement of the wiper structure is controlled by means entirely independent of the movement of the wiper mechanism or an associated part thereof.

Another object is to provide a novel fluid distributing means in which an operating fluid is cyclically directed along a path to act upon and cyclically change the direction of travel of a movable part.

A further object is to provide a wiper actuating mechanism comprising a movable part against which a relatively non-compressible fluid is directed, a valve mechanism for directing fluid under pressure against the movable part, and mechanism independent of the movable part for actuating the valve mechanism to control the cycle of operation of the wiper.

A further object is to provide novel fluid actuated valve mechanism for controlling the flow of fluid under pressure to cyclically operate a driver for a windshield wiper or other accessory.

A still further object resides in providing a windshield wiper actuated mechanism in which oil or other non-compressible fluid is caused to directly vibrate a driving part associated with a wiper part.

A still further object is to provide an improved actuating mechanism for oscillating wipers in which a cyclically operated valve controls the oscillation of the wiper solely through the operating fluid; the character of the oscillation, the rate of oscillation, the parking of the wiper within or outside of its operative range being controlled by the construction and actuation of the valve.

Another object of the invention is to provide valve mechanism, to regulate the flow of fluid pressure, directed against a windshield wiper actuating part, which embodies a rotated part; the rotated part in one form of the invention being held against rotation to stop the actuation of the wiper and in another the rotated part is permitted to continuously rotate, being uncoupled from the control valve to interrupt the operation of the wiper.

Another object of the invention is to provide a fluid distributing mechanism for the fluid pressure operation of driven parts having a control valve which does not depend for its operation upon the travel of the driven part and utilizes in its operation a minimum amount of energy.

Another object is to provide a valve or other control capable of controlling the operation of a plurality of wiper accessories or the like.

Another object is to provide actuating mechanism for a windshield wiper or other accessory in which certain means are provided for determining the speed of the wiper across the windshield with separate means for controlling the strokes per minute.

These and other objects and advantages which are considered to reside in the arrangement, construction and combination of parts which go to make the present invention practical in operation and inexpensive in construction will more fully appear from the following description when considered in connection with the annexed claims.

Figure 6:
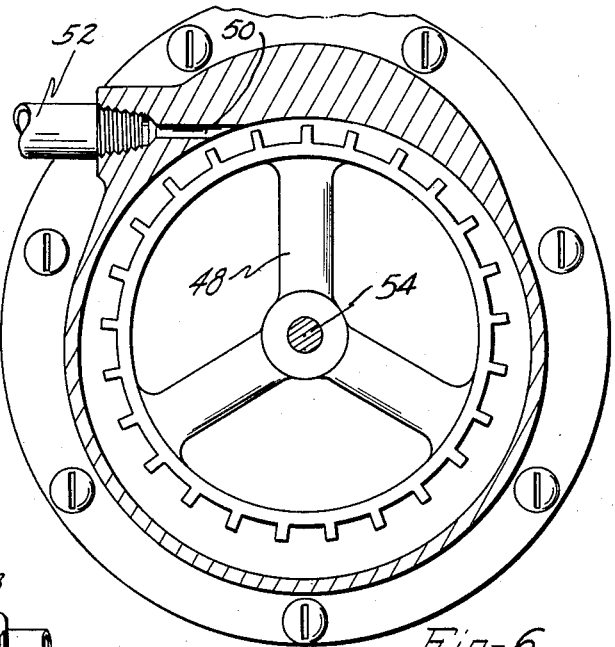
Figure 5:
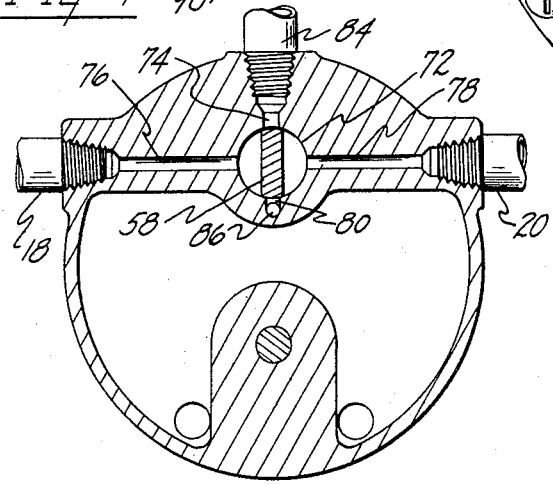
Figure 7:
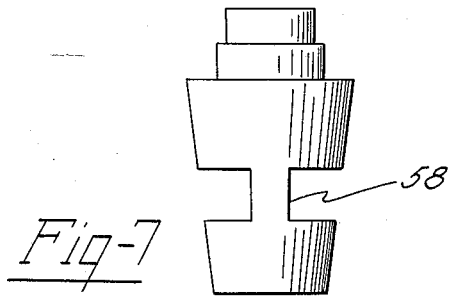
Figures 8, 9, 10, 11:
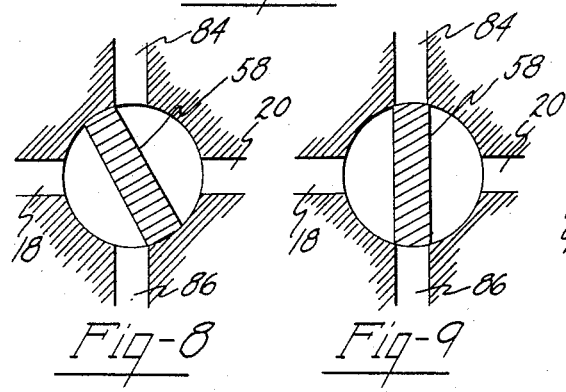
Figure 12:
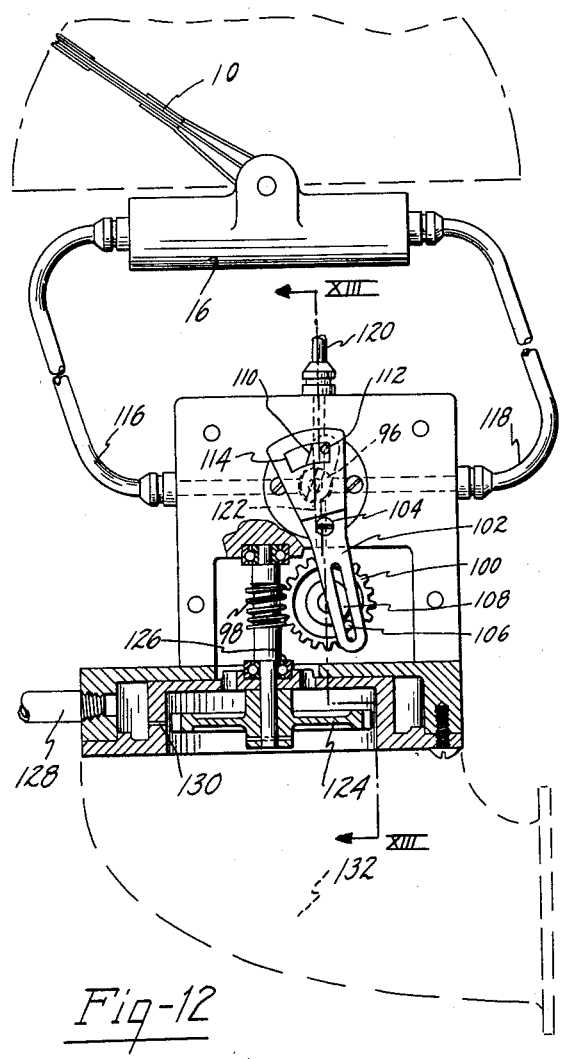
Figure 13:
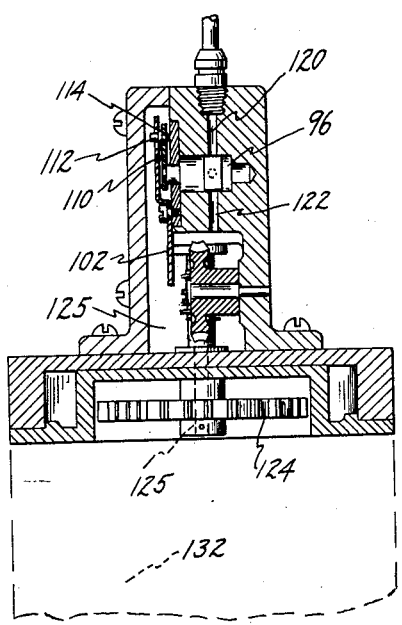
Figure 14:
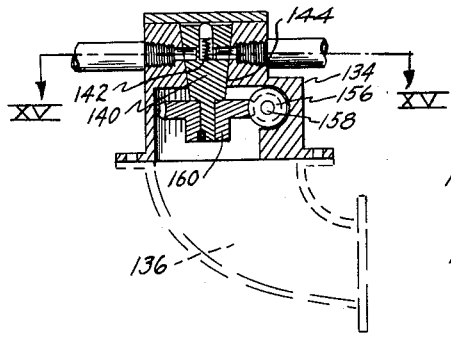
Figure 15:
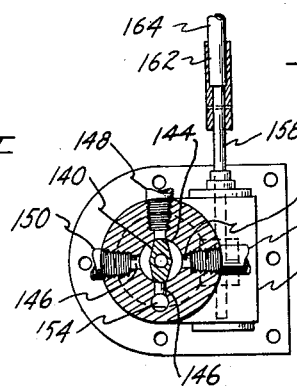

In the drawings,

Fig. 1 is a fragmentary side elevational view of a vehicle showing the principles of the invention applied thereto for the operation of a windshield wiper, Fig. 2 is a schematic representation of the fluid distributing structure, Fig. 3 is a cross-sectional view through the distributor and showing the manner in which it is supported upon the crank case, Fig. 4 is a view of the distributor with the outer cover removed, Fig. 5 is a cross-sectional view taken on line V—V of Fig. 3 of the distributor, Fig. 6 is a cross-sectional view taken on line VI—VI of Fig. 3 of the distributor, Fig. 7 is an elevational view of one form of valve that may be used, Figs. 8 to 11, inclusive, are diagrammatic views showing different parking positions of the valve, Fig. 12 is a view similar to Fig. 3 of a modified form in which the valve is oscillated, Fig. 13 is a cross-sectional view taken on line XIII—XIII of Fig. 12, Fig. 14 is a sectional view showing the control valve driven from a power take-off, and Fig. 15 is a sectional view of the valve taken on line XV—XV of Fig. 14.

In the accompanying drawings several forms of the invention have been shown solely for the purpose of illustrating the principles of the invention and not for the purpose of restricting or limiting the scope thereof. The present invention may take numerous shapes and forms and various ways and means of operating the fluid distributing valve which will readily occur to those skilled in the art all within the scope of the present invention. Through the proper selection of known forms of motion and energy transmitting mechanism, the valve may be driven by the flow of fluid in the lubricating system of the vehicle as shown in two of the illustrated forms, by the flow of fluid in the circulating cooling system, by movement of air current created by the cooling fan, from the conventional fan belt not shown and other numerous power take-off points such as the generator shaft, cam shaft, crank shaft and the like. Where relatively constant operating speed of the wiper is desired the utilization of the flow of fluid in the lubricating system of the vehicle has this advantage. Where an increase in wiper speed is desired relatively proportional to engine speed, driving the valve from the fan belt or other point having an operating speed proportional at all times to that of the engine will give this result.

It has been the practice heretofore in commercial forms of windshield wiper mechanism to drive the wiper directly from a fluid motor and to control the reversing of direction of operation and parking through valves actuated by a moving part of the fluid motor. In the present invention I have made a radical departure from such practice and have employed a valve or its equivalent having an operating source distinct from the movement of any part directly associated in its movement with that of the wiper. Through the construction and timing of the operation of my valve, I am able (1) to operate the wiper in one range and park the same out of its normal wiping range, (2) to cause the wiper to momentarily be held under pressure at each end of the operative stroke of the wiper, (3) to move to and hold the wiper at either end of its stroke regardless of the point of interruption of the operating cycle, and (4) to vary the length of the traverse of the wiper.

While the principles of the present invention are particularly adapted to windshield wiper operation they are not so limited in their field of operation. Other accessories such as wig-wag signals, blinker switches, gong and bell clappers and the like may be operatively connected to the fluid actuated vibrating part. Without the use of elaborate clutches, overload releases and similar structures I have provided an arrangement in which the control part may be positively driven or relatively so and controls a fluid drive connection for the actuation of the accessory which is self-timing and permits an interruption of the cycle of operation of the accessory without breakage of parts.

In Fig. 1 of the drawings, a wiper 10 of any suitable construction is shown mounted for oscillation upon the shaft 12 for cleaning the windshield 14. A vibrating part of suitable construction is housed in the chamber 16 to which conduits 18 and 20 are connected to conduct pulsating charges of fluid pressure from the distributor 22 shown supported from the crank case 24 of the engine 26. As shown in Fig. 2, where dual wipers 10 are provided, the chambers 16 are connected by a conduit 30 through which fluid moves back and forth in connection with the vibration of the parts 32 located in the chambers 16. Each part 32 may take numerous forms such as that of a piston having a rack 34 along one side to drive a gear 36 upon the shaft 12. A restricted bleeder port 38 in each piston 32 assures the existence of an operating column of fluid in the conduit 30. Also it will be understood that where only a single chamber 16 is used and one or more wipers are driven therefrom the conduits 18 and 20 will both be directly connected to opposite ends of the chamber 16 as shown in Fig. 12.

As more clearly shown in Fig. 3 the distributor 22 is supported in communicating relation with the crank case 24 upon a deflected portion 40 thereof having an inclined face 42 with an enlarged opening at 44. Supported in an open bottom casing 46 is a rotor 48 driven by impinging a stream of lubricating oil or other fluid under pressure directed through the nozzle 50. Preferably the nozzle 50 is connected through the conduit 52 with the pressure side of the pump located in the lubricating system of the vehicle. The shaft 54 supports the rotor 48 and is rotated thereby to continuously rotate in one direction the cam 56 during the periods of operation of the engine 26. A rotary valve 58 carries the ratchet wheel 60 which is held against rotation in one direction by the pawl 62 and continuously rotated by a step by step movement in the opposite direction through the pawl 64 upon the arm 66. A spring 68 holds the pawls 62 and 64 in operative relation with the ratchet wheel 60 while the spring 70 holds the arm 66 against the cam 56. As the cam 56 is of cylindrical construction through at least 180° of its circumference the rotor 48 only has a load during a portion of its rotation which gives the same ample opportunity to start and pick up speed. It will be understood that by designing the cam 56 so as to rock the arm 66, once each revolution of the cam 56, a distance required to advance the wheel 60 the distance between adjacent teeth, then, with a ratchet wheel having sixty teeth, for example, the wheel 60 will rotate at one-sixtieth the speed of the rotor. In practice the wheel 60 and the valve 58 connected thereto are designed to have a speed of rotation of 25 to 30 revolutions per minute so as to drive the wiper 10 at the rate of 50 to 60 strokes per minute; the wiper making two strokes for each rotation of the valve 58. In some cases it may be desired to insert reduction gearing between the shaft 54 and the cam 56 to reduce the rate of vibration of the arm 66.

The valve 58 operates in a valve chamber 72 with which passages 74, 76, 78 and 80 communicate at one end and are connected with the conduits 84, 18, 20, and 86, respectively, at the other; the conduit 84 being connected to the pressure side of the lubricating system or some other source of fluid pressure and the conduit 86 being the exhaust and discharging into the crank case. To avoid an accumulation of oil used to drive the rotor 48, the entire area beneath the rotor 48 is preferably open so as to enable the oil to be rapidly drawn away by gravity.

As shown in Figs. 5 and 7, the valve 58 is so disposed that fluid under pressure is directed through the conduit 18 during approximately 90° of rotation of the valve while fluid is being exhausted from the conduit 20 during the same period and similarly with reference to the pressure phase in the conduit 20. Generally speaking, the amount of oil flow passing past the valve 58 during a pressure phase in either the conduits 18 or 20 is adequate to displace the part 32 from one end of the chamber 16 to the other and to move the wiper from one end of its stroke to the other. By proper valve shape and rate of operation the pressure phase in the conduits 18 and 20 can be reduced or increased with the result that in the first case the stroke of the part 32 and wiper will be shorter and in the second the part 32 will be momentarily arrested at the end of each complete stroke of the part 32 and the wiper. The desired rate of wiper operation may be obtained through control of rate of operation of the valve 58 and rate of displacement of flow of fluid required to move the part 32 from one end of its stroke to the other.

In order to interrupt the operation of the wiper, in the heretofore described form of the invention, the arm 66 is lifted away from the cam 56 through a push-pull cable 88 operated from the dash and actuating a part 90 which is guided in a groove 92 and engages a turned down end 94 of the arm 66. By referring to Figs. 8 to 11, inclusive, it will be seen that regardless of the point in the cycle of operation that the arm 66 is lifted from the cam 56, the wiper will always be moved to the end of its stroke and held in that position. If the valve stops in the position of Fig. 8 the wiper will be parked at one end of its stroke under pressure. Stoppage of the valve in the position of Figs. 9 and 11 just between the pressure and exhaust phase will find the wiper at one end or the other of its stroke where it will be held by the trapped column of operation fluid. With the valve 58 in the position in Fig. 10 the wiper will be parked with pressure at the other end of the stroke from that of the position of Fig. 8. From this it will be understood that with the timing and construction of the valve 58 such that the piston 32 does not reach the ends of its chamber 16 before its direction is changed, upon interruption of the cycle of operation by lifting the arm 66 from the cam 56, the wiper will be parked out of its normal operating range and in most cases under pressure for the reason that there is but slight chance of the valve 58 stopping in the positions of Figs. 9 and 11.

One feature of the cam and vibrated arm arrangement described above resides in the ability to vary the strokes per minute of the wiper through the manipulation of the cable 88. When the design of the cam 56 is such that it moves the arm 66 a sufficient distance to cause the pawl 64 to engage only every fourth tooth of the ratchet wheel, by moving the arm 66 away from the cam 56, but not sufficiently to entirely clear the same, the movement of the arm 66 thereby is reduced and the pawl 64 may be caused to engage every second or third tooth or every tooth depending upon the extent of movement of the cable 88. In this connection it should be fully appreciated that in my illustrated embodiment above described, the rate of oscillation or movement of the wiper across the windshield is controlled by the rate of fluid flow in the conduits 18 and 20 while the strokes per minute are controlled by separate mechanism, namely, the actuating means for the valve 58.

In Figs. 12 and 13 I have shown a modified form of the heretofore described construction in which the control valve 96 is driven by a worm gear 98 and wheel 100 through a lever 102 supported for oscillating movement about the point 104. A pin 106 upon the wheel 100 operates in a slot 108 in the lever 102 to drive the same. An arm 110 on the valve 96 carries a pin 112 which projects into the elongated slot 114 of the lever 102. Upon oscillation of the lever 102 the valve 96 is rocked back and forth to alternately connect the conduits 116 and 118 with the conduit 120 leading from the pressure side of the oil pump and the exhaust conduit 122. The valve 96 may be similar in construction to that shown in Fig. 7 except that it is shown cylindrical rather than tapered. The engagement between the pin 112 and the ends of the slot 114 upon oscillation of the lever 102 will oscillate the valve 96 from a position corresponding to that shown in Fig. 8 to that shown in Fig. 10. The lost motion connection between the pin 112 and slot 114 times the actuation of the valve with respect to the displacing flow of oil under pressure in the conduits 116 and 118 directed against the piston in the cylinder 16 for oscillating the wiper 10. The rotor 124 rotates the shaft 126 upon which the worm gear 98 is mounted through oil from the conduit 128 discharged through one or more nozzles 130 against the rotor 124. The casing 132 shown in dotted outline supports the distributor unit and connects the same with the crank case. The operation of the wiper 10 in the form of the invention shown in Figs. 12 and 13 may be started and stopped in a suitable manner as will be readily appreciated by those skilled in the art. As in the case of the construction of Fig. 1, and for similar reasons, the valve control mechanism will park the wiper 10 at one end or the other of its stroke regardless of the point at which the cycle of operation of the valve 96 is interrupted. The number of strokes per minute of the wiper 10 will correspond to the number of oscillations of the lever 102 with the speed of the wiper 10 over the windshield depending upon the rate of displacement of the piston in the cylinder 16.

In Figs. 14 and 15 a valve and driving unit 134 is shown mounted upon a crank case connection 136. A tapered valve 140 is seated by a spring 142 in a correspondingly tapered valve seat 144. Opening through the walls of the seat 144 are passages 146 connecting with the inlet oil line 148, and the outlet conduits 150 and 152 extending to the operating cylinder and the exhaust 154. A worm gear 156 mounted on a shaft 158 drives the worm wheel 160 concentrically mounted on the valve 140. As shown, a socket 162 is fixed to the shaft 158 into which a flexible shaft 164 is soldered. The shaft 164 extends to and is connected to any suitable power take-off point such as the cam shaft, generator shaft, pump shaft, etc. In this form of the invention as in that of Fig. 1 the control valve is continuously driven in one direction during the operation of the wiper. The cycle of operation of the valve 140 and its parking characteristics are the same as described with reference to Figs. 1 to 11, inclusive.

In certain patented art is found the disclosure in which an oil driven rotor directly actuates an air pump for maintaining an operating supply of vacuum for a vacuum actuated wiper. My experiments establish the fact that the power that can be developed by impinging a stream of oil taken from the lubricating system against a rotor is very low. The starting torque is practically nil with adequate power for rotating the valve only being developed when the rotor is being rotated at a relatively high rate of speed unless a high reduction gear is used as disclosed in Fig. 12. For this reason it is only through the types of arrangement shown in Figs. 4 and 12 in which there is little or negligible load upon the rotor that it is practical to use for windshield wiper operation a turbine run off of the oil pressure line.

The accompanying drawings are based upon experimental construction which has been designed to facilitate the making of tool room samples. It is to be understood that the actual commercial forms of the invention insofar as principles of construction and fabrication are concerned may differ considerably from the illustrated embodiments in order to facilitate and reduce the cost of manufacture.

Having thus described my invention, what I desire to protect by Letters Patent and claim is:

1. In a windshield wiper mechanism, the combination of a vibrating driving part for actuating a wiper or other accessory with a desired movement, conduit means for directing fluid under pressure against said part to cause said part to vibrate, a valve located in said means and connected to a source of fluid pressure for directing fluid pressure against said part, means cyclically actuating said valve including a continuous rotating rotor geared to said valve, and manually selectively operable means for operatively disconnecting said rotor from said valve to interrupt the operation of said driving part and associated wiper.

2. Windshield wiper mechanism for imparting back and forth movement to a driver part operatively connected to an oscillating blade moving over the windshield comprising a source of relatively non-compressible fluid under pressure, conduit means connected to said source, a vibrating driver part located in said conduit means, means limiting the stroke of said driver part, a continuously movable valve in said conduit means for regulating the flow of pulsating charges of fluid pressure against the driver part to move the same to one end of the stroke, means controlling the movement of said valve, said valve and control means therefor being characterized in construction and operation by the fact that the pressure phase of the pulsating charges of fluid is of greater duration than normally required to move said driver part to the end of a stroke, whereby said driver part is at least momentarily arrested at the end of its stroke under pressure, and means for interrupting the movement of said valve during a pressure phase of said pulsating charge of fluid to park said driver part at one end of its stroke.

SAMUEL A. SNELL.